E. F. SMITH.
CENTER GRINDER.
APPLICATION FILED MAR. 13, 1916.
1,196,165.  Patented Aug. 29, 1916.
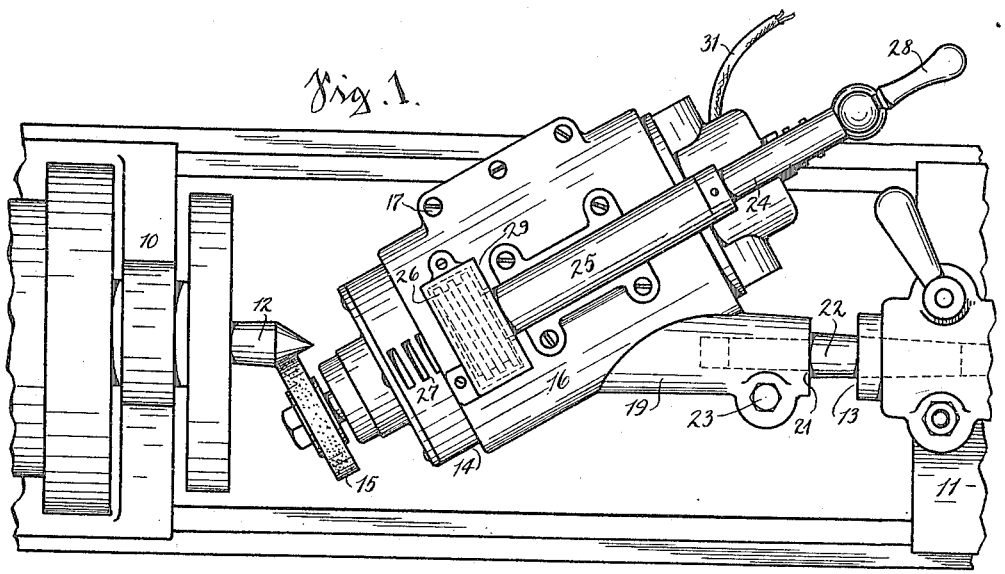
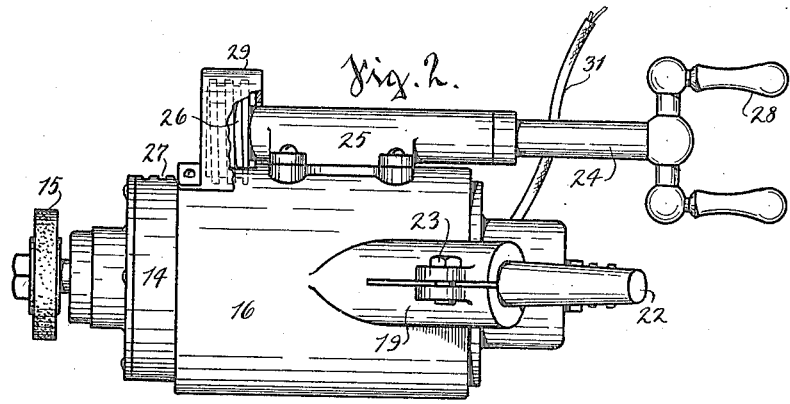
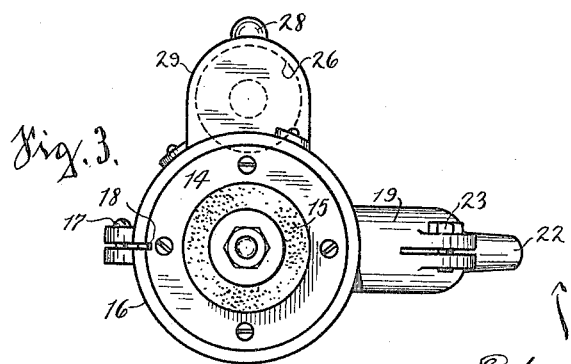
Inventor.
Edward F. Smith
by C. Spengel Atty.

UNITED STATES PATENT OFFICE.

EDWARD F. SMITH, OF CINCINNATI, OHIO, ASSIGNOR TO THE NEIL & SMITH ELECTRIC TOOL CO., OF CINCINNATI, OHIO, A CORPORATION OF OHIO.

CENTER-GRINDER.

1,196,165.  Specification of Letters Patent.  Patented Aug. 29, 1916.

Application filed March 13, 1916.  Serial No. 83,721.

*To all whom it may concern:*

Be it known that I, EDWARD F. SMITH, residing at Cincinnati, Hamilton county, State of Ohio, have invented a certain new and useful Center-Grinder, of which the following is a clear, full, and exact description, attention being called to the drawing which accompanies this application and forms a part thereof.

This invention concerns implements for grinding the centers of lathes which serve to hold between them the work while the same is acted upon by the lathe tool. These centers, one seated in the headstock and the other in the tailstock of the lathe, are pointed at a fixed angle which is usually 60 degrees and in order to be able to do accurate work on the lathe it is essential that this angle is maintained and that the points of the centers remain in perfect alinement with each other as well as with the axis of rotation of the lathe spindle. These centers are subject to considerable wear and must frequently be reground to be kept in proper condition as above outlined. For obvious reasons this regrinding is a most delicate operation requiring work of the utmost precision. This includes accurate adjustment of the grinding means to operate at the proper angle and whatever method and means are used, successful results depend on the skill and on the ability of the person to apply and to use the means available for the purpose.

The object of my invention is to provide an implement for the purpose which for positioning and for proper adjustment does not depend on the skill of the user but is fitted to take advantage of existing conditions on the lathe so that its mere attachment insures also proper position for use.

The invention consists of the construction of such an implement as hereinafter described and claimed and as illustrated in the accompanying drawing in which:

Figure 1, shows a top view of a portion of a lathe with my implement in position for use. Fig. 2, is a side view of the implement and Fig. 3, is an end view of it and shows the left end of the same having reference to Fig. 2.

In the drawing numerals 10 and 11, indicate headstock and tailstock respectively of a lathe.

12 indicates a lathe center seated in the spindle of the headstock.

13 indicates the socket which receives the center of the tailstock, this center having been removed. The centers are seated in their respective sockets with a taper fit, the sockets of any given type and size of lathe being usually alike so that the centers may be interchanged and fit either socket. For grinding the centers I use a grinding tool electrically operated by a motor of which 14 is the housing in which the motor is contained. 15 is the grinding wheel driven by this motor and 16 is a frame in which the motor is supported and which is fitted to the motor housing in a manner to firmly support the same but permitting longitudinal adjustment of it. To permit proper fitting of the frame to the motor housing, the former is open along one side and screws 17 are provided to permit close adjustment. A key 18 prevents turning of the motor in the frame. A cylindrical boss 19 projects at an angle from the outside of the frame of which it forms an integral part. It contains a socket adapted to receive the cylindrical end 21 of a shank 22, which is of a taper adapted to fit socket 13 of the tailstock. Extending from its outer end inwardly, the boss is partly open on one side and flanges are provided opposite each other on this open part which are adapted to receive a clamping screw 23, whereby shank 22, is firmly held in place. A shaft 24 is mounted in a bearing 25, on the outside of frame 16 and a worm-wheel 26 is seated on one end of this shaft which meshes into a rack 27, provided on the outside of the motor housing. Operative connection with the rack is made possible by means of an opening in frame 16, through which this wheel extends. By rotating shaft 24 by means of a handle 28 in either direction, the motor with the grinding-wheel may likewise be moved in either direction on frame 16. A cover 29 is preferably used to inclose the worm-wheel and to cover the opening in frame 16 through which it makes connection with rack 27. In using this implement, existing conditions are taken advantage of. The center to be ground is seated in the headstock so as to be running on its own center while being ground. The center in the tailstock is removed and the implement, by means of its shank 22, is mounted in place thereof. Boss 19 is so positioned on frame 16, that the axis of shank 22 when the shank is inserted into said boss, falls in a plane with the axis of rotation of the grinding-wheel and that the angular relation of the axis first mentioned to the other one, is such as to produce an angle which equals one half of the angle to which the point of the lathe center is to be ground. This latter angle is usually of a fixed standard which is generally 60 degrees and the implement is designed to meet these conditions. Therefore the angle which the two axes referred to form between them is 30 degrees as shown in Fig. 1, of the drawing. With the implement thus constructed, its mere positioning on the tailstock insures accurate position of the acting surface of the grinding-wheel with reference to the center to be ground and no further adjustment is needed. Electrical connection is made by means of a cable 31 and as soon as this is done, the implement is ready for grinding. By use of handle 28, the grinding-wheel is moved over the surface to be ground, this movement being exactly in the desired direction to produce the 60 degree point to which the lathe center is to be ground. The feed movement, that is depth of cut, is obtained by moving the spindle in the tailstock which carries the implement forward toward the headstock. Inasmuch as the tapering sockets which receive the lathe centers differ in the various types and sizes of lathes, it is proposed to provide shanks 22 to fit these various sockets. End 21 however of these shanks which is received by the socket in boss 19 of the implement is to remain standard to said socket.

Having described my invention, I claim as new:

1. In a grinding-implement, the combination of a grinding wheel, an electric motor comprising a housing and whereby this wheel is actuated, a frame to which this housing is slidably fitted to permit adjusting movement of the motor in a direction parallel to the axis of rotation of the grinding wheel, an adjusting shaft mounted for rotation on the outside of the frame and parallel to the axis mentioned, an opening provided in the frame and opposite one end of this shaft, a worm-wheel mounted on this end and extending with its periphery through said opening in the frame, a handle on the other end of this shaft, a rack on the motor housing adapted to be engaged by the worm-wheel and means to support the frame which carries the motor.

2. In a grinding-implement, the combination of an electric motor, a grinding-wheel carried on it and actuated thereby, a frame to which this motor is slidably fitted, means to move the motor on the frame for adjusting the position of the grinding-wheel, a cylindrical boss containing a socket and projecting at an angle from the frame on which it forms an integral part and a shank fitted to be received by the socket in this boss and adapted to be seated in the socket provided for the center in the tailstock.

In testimony whereof, I hereunto affix my signature.

EDWARD F. SMITH.

Copies of this patent may be obtained for five cents each, by addressing the "Commissioner of Patents, Washington, D. C."